United States Patent [19]

Wang et al.

[11] Patent Number: 5,498,785

[45] Date of Patent: Mar. 12, 1996

[54] CONTINUOUS PROCESS FOR THE AMINOLYSIS OF ETHYLENE COPOLYMERS

[75] Inventors: James H. Wang, Appleton, Wis.; Victor P. Kurkov, San Rafael, Calif.; Leslie P. Theard, Houston; David Rosendale, Orange, both of Tex.

[73] Assignee: Chevron Chemical Company, San Ramon, Calif.

[21] Appl. No.: 181,027

[22] Filed: Jan. 14, 1994

[51] Int. Cl.$^6$ .................................................. C08F 8/32
[52] U.S. Cl. ................... 525/371; 525/329.9; 525/330.5; 525/372; 525/373; 525/374; 525/375; 525/378
[58] Field of Search .................................. 525/378, 371, 525/372, 373, 374, 375

[56] References Cited

U.S. PATENT DOCUMENTS

| | | |
|---|---|---|
| 3,350,372 | 10/1967 | Anspon et al. . |
| 3,429,860 | 2/1969 | Hurst . |
| 4,233,193 | 11/1980 | Hochreuter et al. . |
| 4,566,997 | 1/1986 | Satoh . |
| 4,874,824 | 10/1989 | Hallden-Abberton et al. ......... 525/379 |

FOREIGN PATENT DOCUMENTS 0355408  2/1990  European Pat. Off. .
2693202  1/1994  France .

*Primary Examiner*—Bernard Lipman
*Attorney, Agent, or Firm*—Burns, Doane, Swecker and Mathis

[57] ABSTRACT

A continuous process for the aminolysis of polymers produced from ethylenically unsaturated structural units comprising contacting, in a reaction vessel, (a) a molten polymer containing structural units produced from alpha-olefins having from 2 to 8 carbons atoms, and esters of of $\alpha,\beta$-ethylenically-unsaturated carboxylic acids in a reaction vessel; and (b) a liquid phase comprising an amine-containing compound, e.g., an alkylamine having an alkyl group containing 1–30 carbon atoms, ammonia, or derivatives thereof, in the presence of (c) a catalytically effective amount of a catalyst, which is preferably a metal-containing solution, for a period of time effective to produce a polymer containing acrylamide structural units, wherein the period of time is less than about 1 hour.

This process is performed continuously in a reaction vessel, preferably in at least one reactive extruder, under conditions effective to provide an ethylene co-polymer containing acrylamide structural units.

28 Claims, No Drawings

CONTINUOUS PROCESS FOR THE AMINOLYSIS OF ETHYLENE COPOLYMERS

BACKGROUND OF THE INVENTION

The present invention relates to a process for the aminolysis of ethylene polymers and in particular, ethylene-alkyl acrylate copolymers.

Ethylene polymers and ionomers and, in particular, co- and terpolymers such as poly(ethylene-co-acrylamide-co-sodium acrylate) can be effectively employed within a variety of environments depending on their mechanical and optical properties.

For example, certain of these ethylene-containing polymers can be employed in place of traditional polyolefins within adhesive compositions. Moreover, such polymers can replace polyacrylamide homopolymers in water treatment, beer and wine clarification, food processing, and the like. One particular useful environment involves the use of the polymers within multilayer films.

While the art is capable of producing such polymers, it has been largely ineffective in providing a continuous method for producing polymers having certain desired mechanical and optical properties, particularly on an industrial scale.

For example, batch ammonolysis of alkylene-alkyl acrylate polymers is recognized within the art. In particular, U.S. Pat. No. 3,429,860 to Hurst relates to a batch process for the ammonolysis of ethylene-alkyl acrylate copolymers utilizing an aqueous ammonia solution in the presence of a minor quantity of an alkali metal hydroxide and an inert solvent. However, this batch process, which occurs within a heated reactor, requires a reaction time on the order of 2-20 hours and further requires a costly post-reaction washing of the product in order to obtain the desired product in a finely divided form. Because of these limitations, such a process cannot be effectively employed on an industrial scale.

Accordingly, the need still exists for a process which overcomes such deficiencies and is capable of effectively providing a desired ethylene copolymer.

SUMMARY OF THE INVENTION

Among other things, the present invention is based upon the surprising discovery that ethylene polymers containing structural units based on acrylamides, as well as carboxylic acids and their salts, and, optionally, esters of carboxylic acids can be continuously produced in a relatively short period of time by a process which is capable of being utilized on an industrial scale.

In particular, the present invention relates to a continuous process for the production of polymers containing structural units derived from ethylenically unsaturated monomers comprising contacting, in a reaction vessel, (a) a molten polymer containing structural units produced from alpha-olefins having from 2 to 8 carbons atoms, and α,β-ethylenically-unsaturated carboxylic acids or derivatives thereof such as ester and anhydrides, in a reaction vessel; and (b) a liquid phase comprising at least one amine-containing compound selected from among an alkylamine having an alkyl group containing 1–30 carbon atoms, ammonia, and derivatives thereof, in the presence of a catalytically effective amount of a catalyst selected from among metals such as metallic lead or zinc; metal-containing solutions such as aqueous solutions of sodium or potassium hydroxide; organic and inorganic amides such as N,N-dimethylaluminum amide, tin amide and titanium amide; alkyl ammonium salts; hydroxy-substituted nitrogen-containing heterocyclic compounds such as 2-hydroxy pyridine, 2-hydroxy imidazole, hydroxy oxazoles, hydroxy thiazoles, 2-hydroxy quinoline and the like; as well as polyethylene glycol and crown ethers, for a period of time effective to produce a polymer containing acrylamide structural units, wherein the period of time is less than about 1 hour and preferably less than 10 minutes. This process is performed continuously in the reaction vessel, which is preferably at least one reactive extruder, under conditions effective to provide a polymer containing the desired acrylamide structural units.

In another aspect of the invention, when the polymer employed as a starting material in the present invention does not contain carboxylic acid salt functionalities, ester structural units, e.g., alkyl (meth)acrylate, can be converted (saponified) "in situ" to salt structural units during the process. Such a process is capable of producing ionomers having superior mechanical and optical properties.

In yet another aspect, the reaction vessel is pressurized so as to maintain the ammonia or amine-containing compound in the liquid phase during the process.

DETAILED DESCRIPTION OF THE PREFERRED EMBODIMENTS

As discussed above, the process of the present invention relates to the aminolysis of ethylene polymers and/or ionomers. In this regard, although the present specification will focus on the preferred "ethylene" polymers, it is equally applicable to polymers containing structural units produced from other ethylenically unsaturated monomers. Also, to further simplify terminology in the specification, while the preferred embodiments utilize the term "polymer," it is apparent that they can include ionomers thereof. Furthermore, the term "copolymer" can include 2 or more monomer constituents as well as substituted derivatives thereof.

The ethylene polymers which can be employed as a starting material in the process of the present invention include both structural units produced from (i) alpha-olefins and (ii) α,β-ethylenically-unsaturated carboxylic acids or derivatives thereof. Suitable examples of preferred copolymers include ethylene-alkyl (meth)acrylate copolymers of ethylene and acrylic or methacrylic esters of α,β-ethylenically-unsaturated carboxylic acids.

Monomer (i) comprises alpha-olefins having from 2 to 8 carbon atoms. Preferably, monomer (i) comprises alpha-olefins having from 2 to 3 carbon atoms, and more preferably, monomer (i) is ethylene.

Monomer (ii) comprises α,β-ethylenically-unsaturated carboxylic acids having from 4 to 22 carbon atoms and/or derivatives thereof. Preferably, monomer (ii) has from 4 to 13 carbon atoms, and more preferably has from 4 to 8 carbon atoms.

Examples of suitable acids include acrylic acid, methacrylic acid and itaconic acid.

Derivatives of such acids can include esters, e.g., methyl acrylate, butyl acrylate, and butyl methacrylate, as well as anhydrides such as maleic anhydride. The preferred derivatives are esters and, in particular, alkyl acrylates. Preferably, the alkyl group contains from one to eight carbon atoms, and more preferably contains from one to four carbon atoms. Methyl is a preferred alkyl group.

Typically, these copolymers contain from about 1 to 20 mol percent of the α,β-ethylenically-unsaturated carboxylic acids or derivatives thereof in total. Preferably, the copolymers contain about 2 to 20 mol percent, more preferably 3.5 to 12.5 mol percent, and even more preferably, about 5.5 to 12.5 mol percent of the α,β-ethylenically-unsaturated carboxylic acids or derivatives thereof in total. Most preferred are those copolymers containing about 6.5 to 10 mol percent of the α,β-ethylenically-unsaturated carboxylic acids or derivatives thereof.

The melt index of the copolymer should be between 0.5 and 600 g/10 min, preferably between about 1 and 400 g/10 min. The melt index will also depend upon the particular ethylene copolymer employed. For example, where the copolymer contains esters such as methyl acrylate, the melt index can typically range from 10 to 400 g/10 min while the melt index for ionomers can be from 0.5 to 10 g/10 min.

Suitable ethylene polymers can also contain structural units grafted thereto, e.g., vinyl monomer derived units, for example structural units produced from α,β-ethylenically unsaturated monomers which impart desirable polymer properties.

Specific examples of additional structural units include acrylonitrile, styrene and vinyl silane, depending upon the desired application for the final product. For example, acrylonitrile containing polymers can have improved solvent resistance while styrene-containing polymers can have enhanced rigidity.

Furthermore, as discussed above, the ethylene polymers employed in the present invention can also include ionomers, i.e., the ethylene polymer will include the desired quantity of carboxylic acid salt, e.g., acrylic acid salt structural units. As will become apparent, these structural units can also be produced "in situ", during the inventive process.

Examples of the copolymers which are saponified include ethylene-methyl acrylate copolymer, ethylene-methyl methacrylate copolymer, ethylene-ethyl acrylate copolymer, ethylene-propylene-methyl acrylate copolymer, ethylene-propylene-methyl methacrylate copolymer, ethylene-methyl acrylate-acrylic acid copolymer, ethylene-methyl methacrylate-methacrylic acid copolymer, ethylene-acrylic acid copolymer, ethylene-methacrylic acid copolymer, ethylene-maleic anhydride copolymer, maleic anhydride-grafted-ethylene-methyl acrylate copolymer, ethylene-methyl acrylate-maleic anhydride copolymer, acrylic acid-grafted-ethylene-methyl acrylate copolymer, and ethylene-methyl acrylate-butyl acrylate copolymer. Preferably, the copolymers are ethylene-methyl acrylate copolymer, ethylene-methyl methacrylate copolymer, ethylene-ethyl acrylate copolymer, maleic anhydride-grafted-ethylene-methyl acrylate copolymer, and ethylene-methyl acrylate-butyl acrylate copolymer. Most preferred is ethylene-methyl acrylate copolymer.

Techniques for making such polymers are well recognized in the art, however, for sake of completeness, attention is directed to the following.

One process for making these copolymers comprises polymerizing ethylene, alkyl acrylate and/or alkyl methacrylate, and the optional comonomer in autoclaves using free-radical initiation catalysts. This process is described in U.S. Pat. No. 3,350,372, which is incorporated herein by reference in its entirety. Another process for producing copolymers useful in making the ionomer compositions of this invention comprises free-radical polymerization of, e.g., ethylene and alkyl acrylate and/or alkyl methacrylate as described above, followed by reactive extrusion with a compound such as acrylic acid or maleic anhydride.

The present invention involves the contacting the polymeric starting material, while in a molten state, with a liquid phase including an amine-containing compound comprising an alkylamine, aromatic amine, ammonia or derivative thereof. This contact occurs for a period of time sufficient to convert the ester structural units into an acrylamide. Such a period of time is typically less than 30 minutes, preferably less than 5 minutes and more preferably less than 2 minutes and still more preferably less than 1 minute.

The alkylamine which can be employed in the present invention includes those amines having an alkyl group having from 1–30 carbon atoms, and preferably 1–18 carbon atoms. The exact amine is not critical as long as it is not subject to stearic hindrance. Specific examples of suitable amines include isopropyl amine as well as N-alkylamines such as methyl amine, ethyl amine, propyl amine, octyl amine, octadecyl amine, and cyclohexyl amine.

The aromatic amines which can be employed within the present invention include, for example, unsubstituted amines such as benzyl amines as well as substituted amines which can be substituted with other art-recognized functional groups.

Derivatives of ammonia which are suitable for use in the present invention include aqueous or anhydrous ammonium hydroxide and urea.

Furthermore, the liquid phase includes at least one solvent, e.g., water, which is selected such that it does not interfere with the aminolysis process of the present invention. The liquid phase is present in an amount effective to provide the desired degree of aminolysis.

Moreover, this process occurs in the presence of at least one catalytic material. The particular catalyst selected depends on the ethylene polymer employed. In this regard, catalytic materials can be selected from among metals such as metallic lead or zinc; metal-containing solutions such as aqueous solutions of sodium or potassium hydroxide; organic and inorganic amides such as N,N-dimethylaluminum amide, tin amide and titanium amide; alkyl ammonium salts; hydroxy-substituted nitrogen-containing compounds such as 2-hydroxy-pyridine, 2-hydroxy-imidazole and 2-hydroxy-quinoline; as well as polyethylene glycol and crown ethers.

The metal-containing solution comprises a suitable metal in a solvent, where the solvent can comprise any solvent which does not prevent the aminolysis process from occurring. Such solvents can be organic or inorganic, with common solvents including water, alcohols, and polyethylene glycols, or water is preferred.

The metal-containing solution can include, for example, metal hydroxides, metal oxides and/or metal alkoxides.

The metal which can be employed within the metal-containing solution can be selected from among the Group IA, Group IIA, and transition metals. Specific examples of such metals include, lithium, sodium, potassium, rubidium, cesium, calcium, magnesium, zinc, titanium, cobalt, nickel, and copper.

In addition, metals such as metallic lead and zinc can be employed as the catalyst within the inventive process. Other examples of suitable catalysts includes organic and inorganic amides such as N,N-dimethylaluminum amide, tin amide, and titanium amide as well as hydroxy-substituted, nitrogen-containing heterocyclic compounds such as 2-hydroxy pyridine, 2-hydroxy amidazole, 2-hydroxy quinoline, hydroxy oxazoles, hydroxy thiazoles and the like. Furthermore, other suitable catalysts include polyethylene glycol and crown ethers.

Preferably, the catalyst comprises an aqueous solution of a Group IA metal hydroxide or a Group IIA hydroxide. Specific examples of preferred solutions include LiOH, NaOH, KOH, CsOH, Mg(OH)2, Ca(OH)$_2$, Sr(OH)$_2$, and Ba(OH)$_2$, with sodium hydroxide being preferred.

The catalyst is present in at least an amount effective to promote the aminolysis of the ethylene polymer. Furthermore, when the catalyst is an metal-containing solution, e.g., a metal base, that can effectively convert esters which are present, e.g., alkyl (meth)acrylate, to carboxylic acid salts during the process, a greater amount of the base can be employed, i.e., an amount which is effective in providing the desired quantity of acid salt structural units.

In particular, with respect to the preferred use of esters, it is preferred that the molar amount of amine equivalents in the amine-containing solution ranges from 0.5 to 5 mols per mol of ester in the polymer while the molar amount of catalyst is preferably from 0.01–0.20, more preferably 0.02–0.10 and still more preferably 0.02 to 0.05 mols per mol of ester in the copolymer.

As is readily apparent, the amount of amine-containing compound and catalyst, e.g., metal-containing solutions, employed will affect the structure of the final polymer product. For example, if the combined amount of these components is at least a stoichiometric amount needed to convert all the ester structural units which are present, the final product will be substantially devoid of such units. However, if less than such a stoichiometric amount is employed, the ethylene polymer product will include unconverted ester units.

Thus, when ethylene-alkyl acrylate copolymers are employed as the starting material, the use of less than a stoichiometric amount will provide a pentapolymer including ethylene, alkyl acrylate, metal acrylate, acrylic acid, and acrylamide structural units. Such pentapolymers have certain desirable elastomeric properties which can be particularly valuable in low temperature applications. Alternatively, the combined amount of the amine-containing compound and the metal base is at least the stoichiometric amount, the resulting product would be a tetrapolymer containing ethylene, metal acrylate, acrylic acid and acrylamide structural units. As discussed above, such terpolymers can have a combination of optical and mechanical properties which allow them to be employed in a variety of environments.

The process of the present invention is performed under conditions suitable to provide effective aminolysis. For example, suitable temperatures are those effective to convert the ethylene polymer while in the molten state. In this regard, the reaction temperature must be sufficient, e.g., at least about 90° C., to maintain the polymer in the molten state. However, because lower reaction temperatures also correspond to lower reaction rates, typical reaction temperatures range from about 150° C. up to the decomposition temperature of the ethylene polymer starting material with the preferred temperatures being in the range of 200° C. to about 350° C.

The reaction vessel which is employed within the present invention is preferably an extruder, and more preferably, a reactive extruder.

A reactive extruder which is useful in producing compositions of this invention comprises an extruder having a copolymer feed section, one or more reaction sections, a subsequent devolatilization section, and an extrusion section. Typically, these sections are separately jacketed to allow for heating or cooling within each section. These sections can also be vented with one or more vent ports per section to allow the escape of volatile components, such as the solvent from the metal solution and byproducts of the saponification reaction, such as alcohols. Generally, the reactive extruder will also have optional means for introducing reactants into any reaction sections as well as means for mixing components in the reaction section(s) and means for conveying the components through the extruder. Typically, the means for mixing and conveying components to be reacted are screws.

Reactive extruders can have a single screw or multiple screws. Each screw typically has a central shaft with a key-way or spline upon which mixing elements are secured. The reactive extruder may have either co-rotating or counter-rotating screws.

Typically, copolymer to be reacted is fed to the screw through a loss-in-weight feeder, and the solid copolymer is melted in a feed section of the reactive extruder. In some embodiments, all reactants (i.e., copolymer and metal-containing solution) can be fed to the reactive extruder through a feed section. In a preferred embodiment, copolymer is introduced into the reactive extruder in a feed section, and the metal- containing solution is fed to one or more reaction sections. A devolatilization section is a convenient means for removing any solvent and byproducts of the saponification reaction from the saponified composition. Equivalent or additional means for removing volatile components can be used, however, such as drying the ionomer composition under reduced pressure in a tumble dryer.

One reactive extruder which was particularly effective in producing compositions of this invention is a Werner and Pfleiderer co-rotating and intermeshing twin-screw extruder. The reactive extruder has a feed section, a reaction section, a devolatilization section, and a pressurization or pumping section which pushed the product through an extrusion die. Although not critical to the invention, the devolatilization section can have a first portion vented to a condenser maintained at atmospheric pressure, and a second portion vented with sufficient vacuum and capacity to remove essentially all of the volatile components from compositions prior to conveying and extruding them.

Typically, copolymer pellets are introduced into a feed section of a reactive extruder, where the pellets are heated and worked by the screw to form molten or fluid copolymer. The screw elements also convey the molten copolymer from this feed section to a first reaction section, where the molten copolymer and metal-containing solution are mixed.

Irrespective of the vessel employed, the amine-containing compound and the catalyst can be introduced together or separately to one or more feed zones in the reaction vessel. In fact, when more than one reactive extruder is employed, the process can be performed in two or more consecutive extruders arranged in a series with the liquid phase and the catalyst being introduced into one or more feed zones in the reaction path.

It is also preferred that the reaction vessel be pressurized so as to maintain the amine-containing compounds in the liquid phase. In particular, pressurization of the reaction vessel can be effective in significantly increasing the rate of aminolysis of the polymer. For example, where ammonia is employed, the pressure is preferably at least 600 psi. Moreover, this preferably involves pressurization with nitrogen.

In this regard, the reaction vessel can be pressurized by any means recognized in the art. For example, in a reactive extruder having, e.g., multiple screws, this can involve the use of left-handed elements so as to create melt seals between two zones in the extruder.

As discussed above, the process of the present invention is capable of providing a variety of ethylene polymers and ionomers, e.g., tetrapolymers, pentapolymers and the like.

As is apparent, the process of the present invention is capable of providing a variety of advantages over prior art processes. For example, the process of the present invention is continuous and is capable of reducing reaction time from many hours (as discussed within the process of U.S. Pat. No. 3,429,860) to less than an hour, typically less than 10 minutes and often less than 5 minutes.

Furthermore, the process of the present invention is capable of producing polymers containing acrylamide structural units and a finely divided form, e.g., pellets, without the need for any subsequent treatment step, e.g., washing after the reaction.

In fact, because of its flexibility, the process of the present invention is capable of providing a variety of compositions and in fact capable of optimizing the composition of the final product so as to obtain desired mechanical and optical properties. For example, the ethylene polymers of the present invention can have improved adhesion to substrates and in particular polar substrates. In addition, tensile strength can also be increased. The polymer can further have decreased haze and increased gloss compared with traditional polymers.

The present invention will now be illustrated in greater detail by the following examples, but it is to be understood that these examples are only illustrative in nature and are not intended to limit the present invention in any manner.

EXAMPLES

Example I

EMAC® resin (an ethylene-methyl acrylate copolymer product of Chevron Chemical Corporation with a melt index of 20 gms/10 min, methyl acrylate content of 20% by weight as determined by infrared, density of 0.942 gm/cc, and melting point of 83° C., as measured by DSC), was introduced into a Werner & Pfleiderer corrosion resistant ZSK-40 mm twin screw extruder.

Aqueous ammonium hydroxide and sodium hydroxide were used respectively as the amine-containing compound and the catalyst for the exemplified process.

The resin was fed to the said extruder at a throughput of 70 lb/hr. An aqueous ammonia/sodium hydroxide solution containing 3% sodium hydroxide (by weight) and 58% ammonium hydroxide (by weight) was injected into the zone in the extruder where the copolymer was completely molten by heating, at an injection rate of 9.9 lb/hr. The screw speed was 400 rpm. The measured barrel temperature of the extruder is set forth in TABLE I. The polymer strands extruded from the extruder were pelletized. The melt index of the products was 12 gms/10 min. The infrared analysis of the product indicates the presence of amide and carboxylic acid groups. The presence of amide groups was confirmed by nitrogen analysis.

The product obtained has excellent adhesion to aluminum foil as evidenced by the fact that unprimed aluminum foils sealed with the product were inseparable.

TABLE I

| Measured Barrel Temperature of the Extruder for Ammonolysis | | | | | | | |
|---|---|---|---|---|---|---|---|
| Zone 1 (C.°) | Zone 2 (C.°) | Zone 3 (C.°) | Zone 4 (C.°) | Zone 5 (C.°) | Zone 6 (C.°) | Zone 7 (C.°) | Die Temperature (C.°) |
| 235 | 176 | 280 | 276 | 246 | 260 | 238 | 238 |

Example II

The resin and extruder used in this example are the same as those in Example I.

The resin was fed to the reactive extruder at a throughput of 60 lb/hr. An aqueous ammonia/sodium hydroxide solution containing 9% sodium hydroxide (by weight) and 51% ammonium hydroxide (by weight) was injected into the zone in the extruder where the resin was completely molten by heating. The injection rate of the solution was 9.60 lb/hr, the screw speed was 400 rpm, and the measured barrel temperature of the extruder was as listed in Table II. The polymer extrudate was directly pelletized. The melt index was 4.5 gms/10 min. The infrared analysis indicates the presence of amide and carboxylic acid groups. Excellent adhesion to unprimed aluminum foil was also observed.

TABLE II

| Measured Barrel Temperature of the Extruder for Ammonolysis | | | | | | | |
|---|---|---|---|---|---|---|---|
| Zone 1 (C.°) | Zone 2 (C.°) | Zone 3 (C.°) | Zone 4 (C.°) | Zone 5 (C.°) | Zone 6 (C.°) | Zone 7 (C.°) | Die Temperature (C.°) |
| 245 | 207 | 283 | 291 | 251 | 263 | 240 | 256 |

Example III

The resin and extruder used in this example are the same as those in Example I.

The resin was fed to the reactive extruder at a throughput of 120 lb/hr. The aqueous ammonia/sodium hydroxide solution containing 9% sodium hydroxide (by weight) and 51% ammonium hydroxide (by weight) was injected to the zone in the extruder where the resin was completely molten by heating. The injection rate of the solution was 9.58 lb/hr, the screw speed was 400 rpm, and the measured barrel temperature of the extruder was as listed in Table III. The infrared analysis indicates the presence of amide and carboxylic acid groups. The resulting product also exhibits good adhesion to unprimed aluminum foil.

TABLE III

| Temperature Profile on the Extruder for Ammonolysis | | | | | | | |
|---|---|---|---|---|---|---|---|
| Zone 1 (C.°) | Zone 2 (C.°) | Zone 3 (C.°) | Zone 4 (C.°) | Zone 5 (C.°) | Zone 6 (C.°) | Zone 7 (C.°) | Die Temperature (C.°) |
| 228 | 174 | 266 | 261 | 250 | 258 | 240 | 240 |

Example IV

This example was preformed to illustrate the advantages that can be associated with pressurizing the reactive vessel. In this example, EMAC® resin (an ethylene-methyl acrylate copolymer product of Chevron Chemical Corporation having a melt index of 20 g/10 min and a methyl acrylate content of 20 wt %) was reacted in an 300 cc autoclave under six sets of conditions.

In example A, the EMAC® was reacted with a five fold excess of ammonia in the form of ammonium hydroxide under reaction conditions of 280° C. and 1150 psig to provide a product having 23% conversion of the ester to the amine in 30 minutes (as determined by nitrogen analysis). In Example B, Example A was repeated with the exception that the reaction vessel was pressurized with nitrogen to 600 psi at room temperature and heated up to the pressure shown in Table IV. As illustrated within Table IV, a 70.4% conversion of the ester to the amide was provided.

In Example C, an ionomer containing 3% of sodium acrylate structural units was employed instead of EMAC®. In this Example, a 62.1% conversion was obtained.

In Example E, an ionomer was formed in situ by reacting the EMAC® with both a caustic solution and an ammonia solution under conditions otherwise the same as in Example B. In this instance, the amide conversion was 58.1%.

Example D illustrates that the temperature can significantly influence the reaction rate. Similarly, Example F illustrates the amount of ammonia can also influence reaction rate. That is, the reaction rate is greater for those processes employing a stoichiometric excess of ammonia, i.e., the five equivalents employed in Examples A–E vs one equivalent in Example F.

amine which had a high enough boiling point to be present in the liquid phase under reaction conditions, illustrated a conversion of nearly 20% of methylacrylate in the EMAC® resin to acrylamide copolymer at a 4 kg/hour throughput and 280° C. Furthermore, the methylamine which was largely in the vapor phase illustrated a minor amount of aminolysis.

TABLE IV

| Example | Copolymer | NH$_4$OH | N$_2$ (psi) | T (°C.) | P (psi) | % N | Degree Ammon. (wt %) | MI (g/10 cm) |
| --- | --- | --- | --- | --- | --- | --- | --- | --- |
| A | EMA, 60 g | 39.8 g | 0 | 280 | 1,150 | 0.76 | 23 | 13.5 |
| B | EMA, 80 g | 39.8 g | 600 | 280 | 2,160 | 2.29 | 70.4 | 3.5 |
| C | Ionomer, 60 g | 39.8 g | 600 | 280 | 1,650 | 1.89 | 62.1 | 2.2 |
| D | Ionomer, 60 g | 39.8 g | 1000 | 150 | 1,030 | <0.15 | <4 | 12.7 |
| E | EMA, 60 g NaOH, 0.85 g | 39.8 g | 600 | 280 | 2,100 | 1.89 | 58.1 | 0.94 |
| F | EMA, 60 g | 8 g, | 600 | 280 | 1,650 | 1.16 | 35.6 | 819 |

Example V

This example was performed to illustrate ammonolysis of EMA copolymers and ionomers within a reactive extruder. The reactive extruder employed within the present invention

TABLE V

| Example | Polymer | Kg/hr (mol/hr) | Amine | Kg/hr (mol/hr) | Catalyst (mol/hr) + N$_2$ (opt) | MI (g/10 min) | N ppm | Conv. % |
| --- | --- | --- | --- | --- | --- | --- | --- | --- |
| A | EMA | 4 (9.3) | C$_{18}$NH$_2$ (2.8 m/hr) | (2.8) | 2-hydroxy pyridine 0.35 | 9.0 | 1,440 | 18.6 |
| B | EMA | 4 (9.3) | CH$_3$NH$_2$ 40% aq. | 0.36 (4.6) | 2-hydroxy pyridine 0.35 | 4.2 | 132 | 0.8 |
| C | EMA | 4 (9.3) | CH$_3$NH$_2$ 40% aq. | 0.38 | 2-hydroxy pyridine 0.23 | 4.2 | 106 | 0.6 |
| D | EMA-derived Ionomer 6% Na acrylate 14% methy acrylate 2.2 Ml | 4 | NH$_4$OH | 0.535 (9.4) | 2-hydroxy pyridine + N$_2$ 200 psi | 1.5 | 98 | 0.5 | was a Werner and Pfleiderer ZSK-30 extruder which included ZME mixing elements which were left-handed turbine type elements selected to effect distributive mixing in the extruder.

In this regard, a C$_{18}$ amine was coated onto EMAC® resin (an ethylene-methyl acrylate copolymer product of Chevron Chemical Co.) having 20 weight percent methyl acrylate and a melt index of 2.4, and fed as a dry blend into the reactive extruder. All other amines were fed as liquids into the reactive extruder. Moreover, as illustrated in the following Table, 2-hydroxy-pyridine was employed as a catalyst. As can be seen by the results in the following table, the C$_{18}$ Example VI-Comparative Example This example was performed to illustrate the significant advantage in adhesion which can be associated with the present invention.

An ethylene-methyl acrylate copolymer containing 20% by weight methyl acrylate and having a melt index of 20 g/10 min. (190° C.) was fed to the Werner & Pfleiderer corrosion-resistant ZSK-40 mm twin screw extruder at a rate of 100 lbs./hr. Aqueous sodium hydroxide was fed to Zone 3 of the extruder at a rate of 4.6 lbs./hr. The screw speed was 400 rpm.

The following temperatures were measured during the process:

TABLE VI

| Zone No. | 1 | 2 | 3 | 4 | 5 | 6 | 7 |
|---|---|---|---|---|---|---|---|
| Temperature (°C.) | 216 | 213 | 270 | 269 | 270 | 271 | 270 |

The vacuum on the second devolatilization zone was 27.9 in. Hg. The reaction product was extruded, cooled in a water bath, and pelletized. The pellets were dried in a vacuum oven at 65° C. and 29.5 in. Hg for 48 hours. The product had a melt index of 3.2 g/10 min. (190° C.). The hydrolysis of the product was 15%. The product of the example was pressed between two surfaces of unprimed aluminum foil under a pressure of about 20,000 psi at a temperature of 350° C. for 5 min. under the pressure. The product was easily peeled from the foil.

In contrast, as discussed previously, under identical pressing conditions, the products obtained from Example I through III could not be separated from the aluminum foil without tearing the foil, (i.e., an inseparable seal was formed by the ammonolyzed product).

We claim:

1. A continuous process for the production of polymers containing acrylamide structural units comprising contacting in a reaction vessel, (a) a molten polymer containing structural units produced from alpha-olefins having from 2 to 8 carbons atoms, and $\alpha,\beta$-ethylenically-unsaturated carboxylic acids or derivatives thereof; and (b) a liquid phase comprising an amine-containing compound selected from among alkylamines having an alkyl group containing 1–30 carbon atoms, aromatic amines, ammonia, and derivatives thereof, in the presence of (c) a catalytically effective amount of at least one catalyst selected from among metallic lead, metallic zinc, inorganic metal-containing solutions, organic and inorganic amides, alkyl ammonium salts, hydroxy-substituted nitrogen-containing heterocyclic compounds, polyethylene glycol and crown ethers, for a period of time effective to produce a polymer containing acrylamide structural units, wherein the period of time is less than about 1 hour.

2. The process according to claim 1 wherein the reaction vessel comprises at least one extruder.

3. The process according to claim 2 wherein the at least one extruder is a twin-screw extruder.

4. The process according to claim 2 wherein the reaction vessel comprises at least two extruders arranged in series.

5. The process according to claim 2 wherein the process includes (i) introducing the catalyst and (ii) introducing the liquid phase at a point downstream of (i).

6. The process according to claim 5 wherein the introduction of (i) and (ii) is associated with spatially separate inlets into the extruder.

7. The process according to claim 5 wherein the introduction of (i) and (ii) is preformed in at least two extruders arranged in series.

8. The process according to claim 1 wherein the reaction vessel is pressurized so as to maintain the amine-containing compound in the liquid phase.

9. The process according to claim 1 wherein the molten polymer contains structural units produced from esters of $\alpha,\beta$-ethylenically unsaturated carboxylic acids.

10. The process according to claim 9 wherein the catalyst is a metal-containing solution which is present in an amount effective to convert a portion of the ester-based structural units to acrylic acid salt structural units.

11. The process according to claim 10 wherein the combined amount of amine-containing compound and the metal-containing solution is not less than the stoichiometric amount to convert substantially all of the ester-based structural units.

12. The process according to claim 10 wherein the combined amount of amine-containing compound and the metal-containing solution is less than the stoichiometric amount to convert substantially all of the ester-based structural units.

13. The process according to claim 9 wherein the molten polymer further contains structural units produced from $\alpha,\beta$-ethylenically unsaturated carboxylic acids and/or anhydrides thereof.

14. The process according to claim 9 wherein the ester is alkyl (meth)acrylate.

15. The process according to claim 14 wherein the molten polymer of (a) is ethylene-methyl acrylate copolymer.

16. The process according to claim 9 wherein the amine-containing compound is an alkylamine.

17. The process according to claim 9 wherein the amine-containing compound is ammonia.

18. The process according to claim 9 wherein the amine-containing compound is ammonium hydroxide.

19. The process according to claim 9 wherein the catalyst comprises sodium hydroxide, potassium hydroxide or mixtures thereof.

20. The process according to claim 1 wherein the process is performed at a temperature from about 180° C. to the decomposition temperature of the ethylene polymer.

21. The process according to claim 1 wherein the molten polymer of (a) has a melt index of 0.1 to 600 gms/10 min.

22. The process according to claim 1 wherein a stoichiometric excess of the amine-containing compound is employed.

23. The process according to claim 1 wherein the period of time is less than 5 minutes.

24. The process according to claim 16 wherein the period of time is less than 2 minutes.

25. The process according to claim 1 wherein the molten polymer (a) contains structural units derived from $\alpha,\beta$-ethylenically-unsaturated carboxylic acids.

26. The product according to claim 25 where the catalyst is an inorganic metal-containing solution.

27. The process according to claim 1 wherein the molten polymer (a) contains structural units derived from anhydrides of $\alpha,\beta$-ethylenically-unsaturated carboxylic acids.

28. The process according to claim 27 wherein the catalyst is an inorganic metal-containing solution.

* * * * *